March 24, 1970  HANS-WERNER SELBACH  3,501,807
MASTICATING SYSTEM FOR PLASTIC MATERIALS
Filed Sept. 8, 1967  4 Sheets-Sheet 1
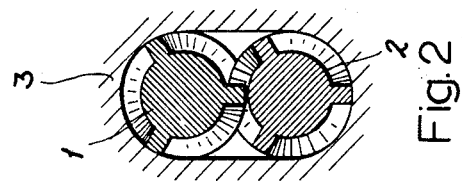
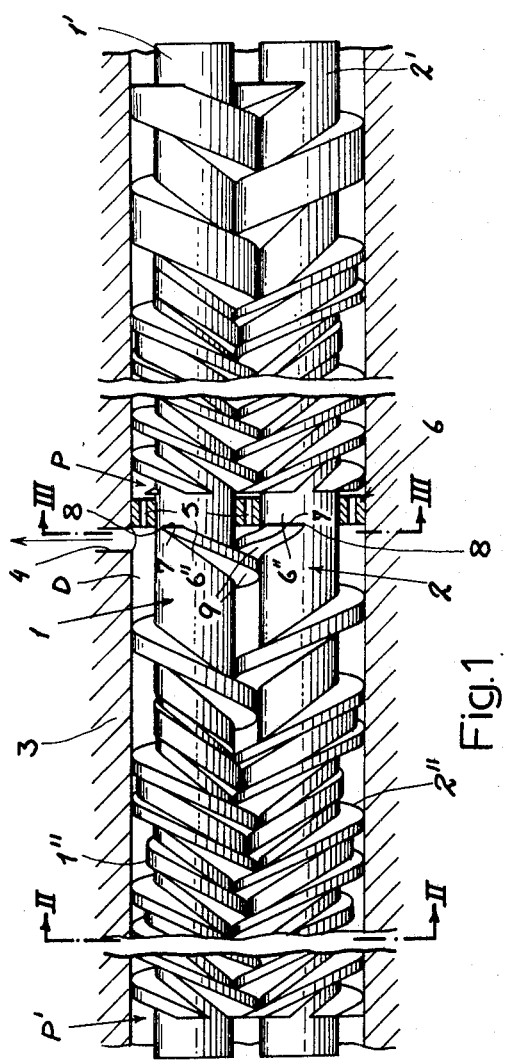
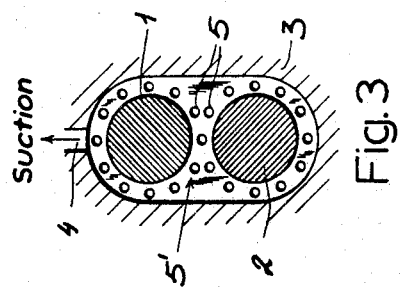
Hans-Werner Selbach
INVENTOR.
BY Karl F. Ross
Attorney

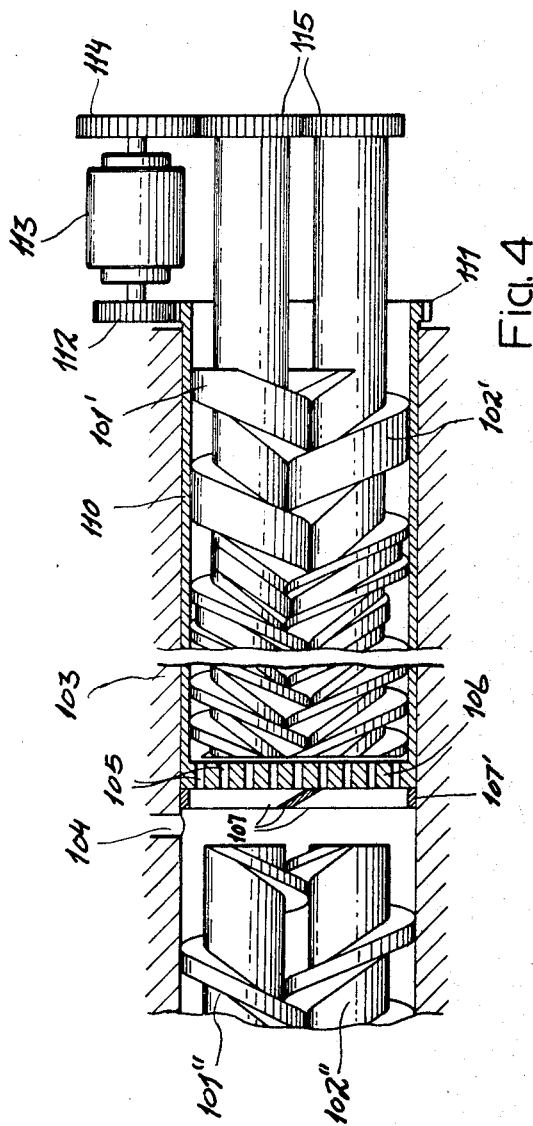
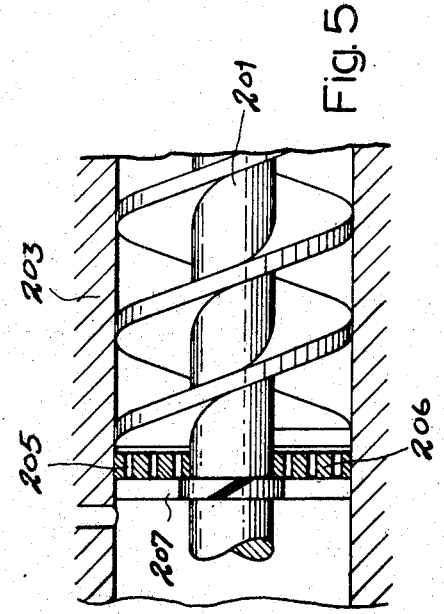
Hans-Werner Selbach
INVENTOR.

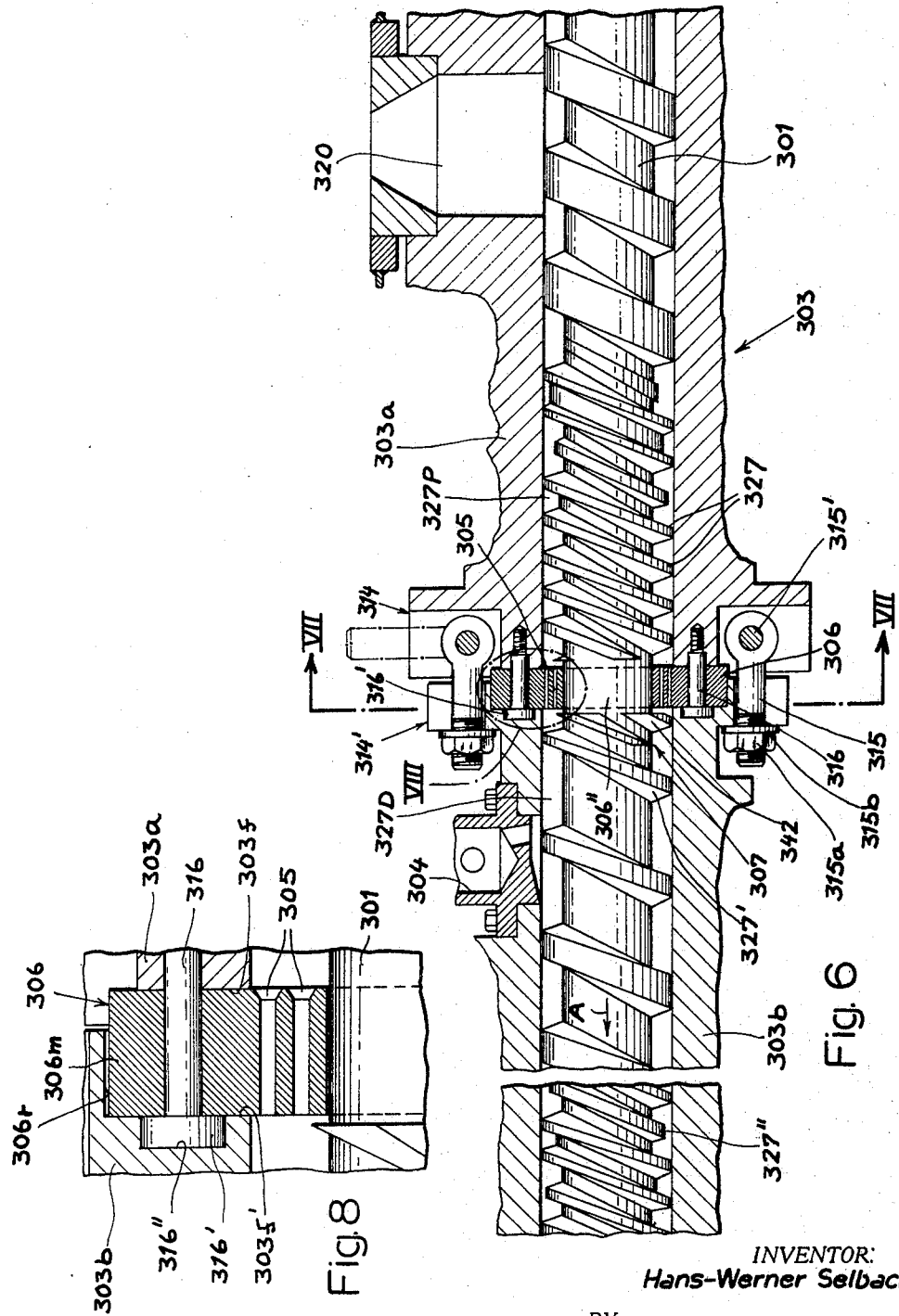

United States Patent Office 3,501,807
Patented Mar. 24, 1970

3,501,807
MASTICATING SYSTEM FOR PLASTIC
MATERIALS
Hans-Werner Selbach, Bad Oeynhausen, Germany, assignor to Rolf Kestermann Maschinenfabrik, Bad Oeynhausen, Germany, a corporation of Germany
Continuation-in-part of application Ser. No. 560,553, June 27, 1966. This application Sept. 8, 1967, Ser. No. 666,311
Claims priority, application Germany, Sept. 10, 1966, K 60,216
The portion of the term of the patent subsequent to Oct. 29, 1985, has been disclaimed
Int. Cl. B29f 3/02, 3/40
U.S. Cl. 18—12                                7 Claims

ABSTRACT OF THE DISCLOSURE

A masticating device for plasticizing a synthetic-resin material (e.g. polyvinylchloride) whose housing is axially separable and forms an elongated plasticizing chambers receiving a placticizing worm for advancing and plasticizing the material; a perforated disk is clamped between the housing parts and is provided with a multiplicity of perforations extending in the direction of flow of the material whereby the material is extruded through the perforations from a compression zone into a decompression zone. A blade sweeps along the downstream face of the disk for severing the material forced through the perforations and granulating the material in the decompression zone, while the housing is provided with at least one passage communicating with the decompression zone proximal to said disk for applying suction for degassing the material.

---

This application is a continuation-in-part of my copending application Ser. No. 560,553 of June 27, 1966, entitled "Plasticizing System For Plastic Materials" (now U.S. Patent No. 3,407,438, issued Oct. 15, 1968).

My present invention relates to a screw-type or worm plasticizer and masticator for synthetic-resin materials and especially to improved devices of this character for use with extrusion or injection-molding apparatus and extends the principles originally set forth in the above-identified copending application.

In my U.S. Patent No. 3,104,420, issued Sept. 24, 1963, I have described a masticator for plasticizing synthetic-resin materials (which are commonly in particulate form and of a thermoplastic nature), including one or more intermeshing and generally parallel worms adapted to squeeze the plastic material between the lands or threads and the grooves of the mating worms, while imparting thereto the compression necessary for fluidifying and homogenizing the plastic mass. It has been recognized that, when worm-type plasticizers for extrusion pressures and other molding machines are used, the development of gases during the mastication operation in the resinous material is highly disadvantageous as may result in the entrainment of gas bubbles or inclusions in the die or in the finished products. It was proposed, therefore, to provide means in the plasticizing device for removing the gases genearted upon mastication of the plastic material by evacuation of the plasticizing chamber. In general, such earlier systems have comprised, along the masticating screw or screws, a pressure zone followed by an evacuated expansion zone having means for drawing off the evolved gases through a wall of the chamber in which the screws are received. Such arrangements have been found to be somewhat useful with plasticizing devices for polyvinyl chloride and like materials in which gas evolution is a significant problem, although such arrangements are not always optimally effective. For example, workers using these arrangements have encountered many difficulties with respect to the nonuniformity of the flow of the plastic material through the device, with respect to the unpredictable characteristics of the transfer of the plastic material from the pressure zone to the evacuated or expansion zone, and with respect to the inability of the worms to advance uniformly the degased mass; problems have also been encountered with respect to the nature and degree of degasification. As to the latter point, it may be stated that the plastic materals advanced by the screws after they have emerged from the degasification stage, frequently contain residual gas inclusions and undesirable decomposition products.

It is the principal object of the present invention to provide a worm or screw-type plasticizer device for the mastication of synthetic resin (thermoplastic) materials and the removal therefrom (or addition thereto) of gaseous components released during plastification or assisting the formation of cellular products in which the disadvantages of earlier systems are avoided and an optimal rate of mastication can be obtained.

Another object of this invention is to provide an improved mastication device which extends the principles originally set forth in my copending application Ser. No. 560,553 and provides technologically more effective structures therefor.

It is a further object of this invention to provide an improved plasticizing device of the character described from which plastic materials such as polyvinyl chlorides are obtainable in a homogeneous and realtively fluid condition, free from gaseous inclusions and decomposition products.

These objects and others which will be apparent hereinafter were obtainable in part with the system described in the aforementioned copending application which provided a unique transition between a compression zone, formed by rotatable screw means having meshing threads or lands arranged to masticate and compact the resin material, and the expansion zone having a greater flow cross-section for the synthetic-resin material; the transition is formed by a plate extending across the generally cylindrical masticator bore and lying in a plane perpendicular to the axis of the screw or screws, while filling the gap between the screw or screws and the surrounding masicator wall. This transition plate has respective rays of passages for the throughflow of the material to be degasified from the compression-zone screws to a second set of worms in the expansion chamber for the further advance of the degassed material to the die.

The invention described in basic terms in that application resided in providing along the forward face of the perforated plate or disk, in the direction of the flow of the plasticized material, one or more cutting edges preferably coupled with the respective worms and adapted to sweep the plate and to sever the strands of plastic material as they are extruded through the bores in the plate. Upon being forced through these bores, the material is exposed to the low pressure in the expansion zone and, by virtue of the sudden relief in ambient pressure, readily releases any entrapped gases which are then evacuated through a wall of the masticator bore ahead of this perforated plate. The intense comminution of the degased plastic material at the forward surface of the plate and its subsequent entrainment and further mastication by the worms forwardly of this surface has been found to result in a substantially complete removal of gases, while the final product is found to be substantially completely free from residual gas inclusions and devoid of decomposition products heretofore contaminating the finished body.

It appears that the basic system described in that application derived its effectiveness from the increased surface area exposed to the reduced pressure in the expansion chamber and promoting the gas to pass through a similar thickness and over a greater area into the plenum chamber surrounding the extruded strands of plastic emerging at the perforations and cut up into particles by the cooperating action of the cutting edges of the plate and the disk. This significant enlargement of the surface area of the fluid mass is a consequence of the granulating action which also has been found to permit a more homogeneous final mastication of the synthetic resin.

As indicated earlier, the granulation step is the result of repeatedly sweeping one or more cutting edges across the forward face and the annular apertures of the disk and, indeed, the sweeping action can be carried out either by rotating the blade means while holding the disk stationary, or by rotating the blade while the disk remains fixed. In some cases it is advantageous to rotate the blade and disk at different speeds or in opposite senses to effect the relative rotation. Moreover, the granulating means including the blade or blades and the perforating disk have been found to prevent excessive plastification of the mass. Thus the body of plastic forced through the apertures of the disk may be substantially homogeneous particles in a preliminary state of plastification, although the invention is equally applicable to arrangements in which the first mastication zone substantially completely plastifies or fluidifies the mass whereby the plastic mass forms droplets of relatively large surface area upon emergence into the depressurization zone.

According to a further feature of this invention, the plastifying device is provided with a fixed perforated disk, while the blade means is carried by the shaft of the worm adjacent an axial region thereof passing through the disk and free from threads or lands which are interrupted in this region. The arrangement may be used with a single-worm system. For double-worm masticators and plastifying devices, the perforated disk can be rotatably mounted upon the shaft or upon other means for driving the disk. In each case it is advantageous to mount the disk with freedom of axial movement so that it can be urged against the blade means by the pressure behind it to effect a clean shearing action. Alternately, the worms may have some axial play so that the counterpressure thereon applied by the plastic may retain the blade against the disk. The number of blades, their spacing and the relative rotary speed of the disk and the blade means can, of course, be selected in accordance with the desired degree of granulation and particle size of the mass to be formed in the expansion chamber. It has been found to be advantageous in substantially all cases to constitute the blade means from the rearmost edges of the thread of the subsequent plasticizing and conveying worms. In a system of this type, no additional blade means need be provided.

It has been found that the system described and claimed in the copending application can be improved with respect to the assembly, mounting, dismounting and fastening of the perforated plate in cooperation with the blade means by forming the disk as a bipartite member bisecting an axial plane of the worm or a common axial plane of a plurality of worms, i.e. along the diametral plane of the worms and cylinder bores, and by subdividing the cylinder housing axially to receive between the parts thereof marginal portions of the disk by means of which the disk is held in place. Thus, according to another aspect of this invention, the housing receiving the worms, and possibly the worms themselves, are provided from a pair of axially spaced parts, at least in the region of the disk, with the perforated disk being fastened between the two housing parts about a thread-free region of the worm. It is possible in this manner to obtain a surprising increase in the useful life of the disk and the blade, the life being optimalized by using, in combination with this disk, worms which carry upon their shaft the cooperating blades. The blades can also be mounted and dismounted independently of the disk. In a preferred embodiment of this aspect of the invention, I provide the confronting housing portion, between which the disk is mounted, with annular formations, e.g. recesses and ridges, flanges or the like, which are interconnectable with one another and/or with the disk to position the separable housing parts and the disk properly in their predetermined relation. Advantageously, the cooperating means includes swingable bolts carried by one of the housing parts which may be provided in outwardly open cutouts of flanges formed on the housing parts and to be locked by nuts which draw the housing parts together against the disk.

The above and other objects, features and advantages of the present invention will become more readily apparent from the following description, reference being made to the accompanying drawing in which:

FIG. 1 is an axial cross-sectional view of a plasticizing device according to this invention, partly shown in diagrammatic form, illustrating basic principles thereof;

FIGS. 2 and 3 are fragmentary cross-sectional views taken generally along the lines II—II and III—III of FIG. 1, respectively;

FIG. 4 is a fragmentary axial cross-sectional view of a modified arrangement for the plastification and displacement of a thermoplastic mass in accordance with this invention;

FIG. 5 is another fragmentary axial cross-sectional view illustrating another embodiment of the invention;/

FIG. 6 is an axial cross-sectional view showing in detail the means for mounting the perforated disk in the worm housing;

FIG. 8 is an enlarged cross-sectional view showing in detail the region VIII of FIG. 6.

Figure 7:
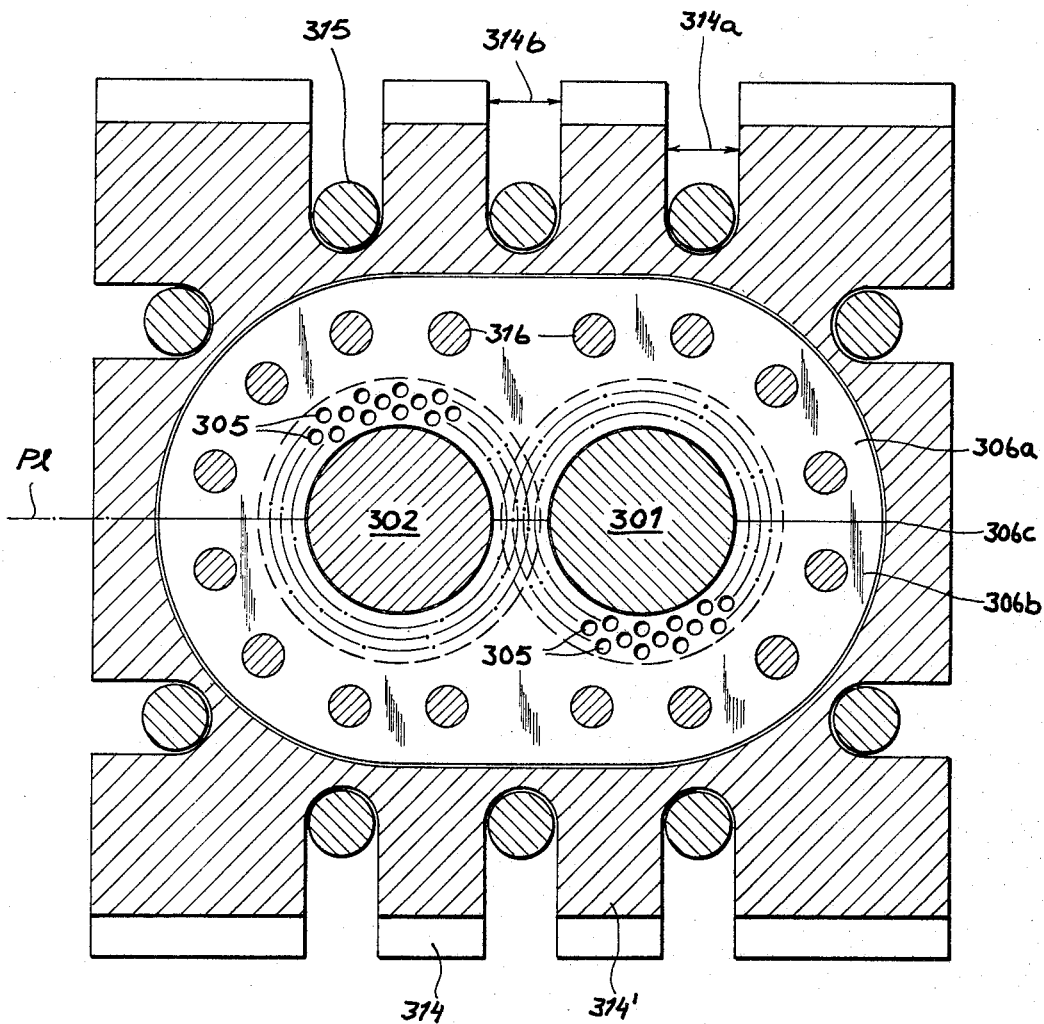
FIG. 7 is a cross-sectional view taken along the line VII—VII of FIG. 6.

FIGS. 1–3 show a double-worm plasticizing device for an extrusion press which is designed to convert a pulverulent thermoplastic mass, e.g., of polyvinyl chloride, into a fluid homogeneous stream extrudable through a head or die (not shown) disposed forwardly of the worms 1 and 2. The worms 1 and 2 are received in a cylindrical mastication-chamber housing 3 which may be provided with heating means as described in the aforementioned patent and will generally be bipartite to receive the disk as described below with reference to FIGS. 6–8; the worms 1 and 2 are intermeshed in the manner also set forth and illustrated in the patent. In general, therefore, it may be said that the worms 1 and 2 are axially subdivided into an upstream or first plastification section 1', 2' and a downstream or second section 1", 2" and in each section form a progressively decreasing flow cross-section for the synthetic-resin material. Consequently, as the synthetic-resin material is advanced from right to left (FIG. 1) along the upstream portions 1', 2' of the worms, the synthetic-resin material is squeezed between the interfitting lands and grooves of the worms and is thoroughly masticated, mixed, homogenized and at least partially fluidified by the rotary action of the worms 1 and 2. Forwardly of the compression zone P of the upstream portions of the worms 1', 2', there is provided a decompression zone D in the chamber 3 for degasification, this zone D being connected via one or more bores 4 in the wall of the housing 3 to a reduced-pressure source such as a vacuum pump. The flow cross-section formed by the worm portions 1" and 2" in the region of the degasification zone D is thus substantially greater than the flow cross-section for the plastic material at the pressure zone and, in a similar manner, the flow cross-section decreases toward the pressure zone P' of the downstream worm portions 1" and 2". The degasified mass is again subjected to thorough mastication, mixing, homogenization and plasticization until it is discharged to an injection-molding press or through the extrusion head.

In accordance with the principles of the present invention, a perforated disk 6 is provided between the pressure zone P and the decompression zone D and is fixed in the housing 3 (FIGS. 6–8) while being provided with perforations 5 extending in the direction of flow of the plastic mass. A cutting means is generally represented at 7 for sweeping the forward face 6' of the disk 5 across the annular arrays 5' of perforations 5, thereby severing the strands of plastic material extruded through these perforations. Just adjacent this face of the disk 6, the bores 4 (coupled to a suction source) are provided to evacuate the decompression chamber D. From FIGS. 1–3, it can be seen that the worms 1 and 2 are rotatably journaled in the disk 6 at zones 6" free from conveyor and masticating threads while the disk is nonrotatable. The cutting means 7 are here carried by the worms 1 and 2 and are formed by cutting edges 8 of the rearmost portion of the sections 9 of the conveyor worms or threads 1", 2" in the region of the decompression chamber.

In the modification of FIG. 4, the worms 101' and 102' are driven independently of the downstream worms 101" and 102" in the housing 103 while the disk 106 is rotatable. For this purpose, the disk 106 is carried by a sleeve 110 whose ring gear 111 meshes with a pinion gear 112 of a motor 113. The other pinion gear 114 of this motor, in turn, meshes with the gears 115 driving the worm portions 101' and 102'. In this embodiment, the blade means is formed by one or more blades 107 diametrically spanning the chamber 103 and fixed in a support ring 107' of the decompression chamber from which the gases are led by bores 104. The disk 106 is formed with perforations 105 through which strands of the plastic material are extruded for granulation by the blades 107.

In the system of FIG. 5, the single worm 201 carries the disk 206 whose perforations are shown at 205 and which is journaled in the housing 203 for cooperation with the fixed blade means 207 which sever the strands of plastic material extruded through the perforations 205. It will be understood that the downstream threads can also be provided upon the worm 201 and that, in a modification of this system, the disk 206 can be driven as illustrated in FIG. 4 and thus rotated relatively to the worm 201 or synchronously therewith.

In all of the foregoing embodiments, the disk may be keyed to its drive means or retained within the housing with freedom of the axial movement so that it is biased by the pressure of the synthetic-resin material against the blade means cooperating therewith. As set forth in the above-identified patent, the worms of each portion of the masticating and conveyor screw increase in pitch and decrease in depth toward the compression side (i.e., in the direction of advance of material). In addition, each worm has a thread rising radially in this direction and received in a complementary groove of the mating thread.

FIGS. 6 through 8 show the means for mounting the perforated plate 306 in the cylinder housing 303 in which the pair of intermeshing worms 301 and 302 are rotatably mounted. The housing 303, whose hopper for receiving the powedered thermoplastic (e.g. polyvinyl chloride) is represented at 320, is subdivided axially into an upstream section 303a and a downstream section 303b between which the perforated plate 306 is clamped. In this embodiment, as has previously been described, the worms 301, 302 are driven (e.g. by the means illustrated and described in the aforementioned patent) to advance the thermoplastic material along the worms 301 and 302 with narrowing flow cross-section between the threads 327 defining a compression chamber 327P. As the plastic material is extruded through the passages 305 in the plate 306, and enters an expansion zone 327D which communicates via a port 304 with suction (or gas-pressure) means as previously described. The suction device draws evolved gases and gas-forming components through the housing wall in the region of the plate 306. Downstream of the plate 306, I provide another thread assembly 327' and 327" for advancing the previously masticated and degased plastic material to the output side of the device with further fluidification. The plate 306 is formed by a pair of plate halves 306a and 306b separated along a line 306c which lies along a common diametro-axial plane Pl of the worms 301, 302 and is thus fitted around these worms. The apertures 305 of this disk are arrayed in circular patterns (see FIGS. 1 through 5), while the disk 306 cooperates with a blade means 307 operating ahead of the plate and cooperating therewith. The blade means 307 has cutting edges 342 which work independently of the plate and may be formed by the ends of the threads 327'.

The disk 306 has a marginal portion 306m clamped between the confronting faces 303f', while being received in a recess 306r in housing part 306b. The disk also receives the nonthreaded or interrupted thread portion 306" of the worms 301 and 302.

The disk 306 is mounted upon the front face 303f of the housing part 303a by arrays of bolts 316 which are threaded into this housing part and have heads 316' overlying the disk. The heads 316' are also received in individual recesses 316" formed in the confronting face 303f' of housing part 303b. The housing parts 303a and 303b are interconnected by a peripheral array of bolts 315 which are mounted in flanges 314 and 314' of these housing parts and their confronting faces. The flanges 314 and 314' are, moreover, formed with peripherally spaced outwardly open aligned cutouts 314a and 314b of a width sufficient to accommodate the bolts 315 which are hinged about pintles 315' (FIG. 6) so that they are swingable into generally radial positions as represented in dot-dash lines at 315". Nuts 315a and washers 315b threadedly engage the bolts 315 and bear against the downstream side of flange 314' to draw the housing parts together. When it is desired to separate the unit, the nuts 315a may be loosened and the bolts 315 swing outwardly to permit the device to be separated. Removal of bolts 316 permits the screws 301, 302 to be withdrawn with the plate 306 or the plate halves 306a and 306b to be separated radially, while the worms remain in place.

This system has the advantage that it can be used interchangeably for vacuum removal of gases and for the introduction of gaseous components into the plastic when, for example, it is desired to produce foamed or cellular articles. In this case, the expanding gas is introduced at 5 under pressure, the pressure being greater than that in the bores 305 which converge in the forward direction (arrow A).

I claim:
1. A masticating device for plasticizing a synthetic-resin material comprising:
    housing means forming an elongated plasticizing chamber;
    plasticizing and conveying worm means rotatable in said chamber and extending therealong for advancing the material along said worm means while plasticizing same, said worm means having an upstream portion of progressively decreasing flow cross-section for said material and a downstream portion of progressively decreasing flow cross-section whereby said material passes successively through a compression zone and a decompression zone along said chamber;
    a perforated disk member mounted in said chamber between said zones and provided with a multiplicity of performations extending in the direction of flow of said material whereby said material is extruded through said perforations from said compression zone into said decompression zone;
    at least one blade member adapted to sweep along the downstream face of said disk for severing the material forced through said perforations and granulating the material in said decompression zone, said housing means being provided with at least one passage communicating with said decompression zone proximal to said disk for connecting said decompression zone to a reduced-pressure source whereby said material is degassed upon emergence into said decompression zone;

means for rotating at least one of said members relative to the other of said members, said worm means extending through both said zones and having a thread-free portion passing through said disk member, said housing means comprising a pair of axially separable housing parts, said disk having a marginal portion interposed between said housing parts; and means for fastening said disk between said houisng parts.

2. A device as defined in claim 1 wherein said worm means includes at least two conveyor screws with mating threads including upstream thread portions and downstream thread portions, said blade member being constituted by the upstream and of the downstream thread portion of each screw.

3. A device as defined in claim 1 wherein said worm means extends through both said zones and is formed with a respective thread portion of progressively decreasing pitch and thread height upstream and downstream of said disk member.

4. A device as defined in claim 1 wherein said means for fastening said disk between said housing parts includes a plurality of peripherally spaced bolts clamping said housing parts together against said disk, the confronting portions of said housing parts being provided with flanges spanned by said bolts, said flanges being formed with peripherally spaced outwardly open cutouts receiving said bolts, said bolts being pivotally mounted on one of said housing parts for swinging movement between a position in which said bolts span said flanges and a position wherein said bolts are disengaged from the flange of the other housing part.

5. A device as defined in claim 1 where said means for fastening said disk between said housing parts includes an array of bolts affixing said disk to one of the confronting faces of said housing parts between which said marginal portion of said disk is clamped.

6. A device as defined in claim 1 wherein said disk comprises at least two disk portions separable along an axial plane of said conveying worm means.

7. A masticating device for plasticizing a synthetic-resin material comprising:

housing means having a pair of axially separable parts forming between them a continuous elongated plasticizing chamber;

plasticizing worm means rotatable in said chamber and having threaded portions on opposite sides of a thread-free zone in the region at which said housing parts are separable for advancing material through said chamber while plasticizing same;

an aperture plate surrounding said worm means at said zone and having a marginal portion sandwiched between said housing parts while forming constricted passages for the through flow of said resin material;

means downstream of said disk including an opening in said housing means for the passage of fluid through a wall of said chamber ahead of said disk, said housing parts having confronting faces in said region; and a first array of bolts affixing said disk to one of said confronting faces, and a second array of bolts spanning said housing parts externally of said disk for releasedly drawing said housing parts together, said disk being removable from said chamber independently of said worm means.

References Cited

UNITED STATES PATENTS

| | | | |
|---|---|---|---|
| 2,662,243 | 12/1953 | Schmuck et al. | 18—12 |
| 2,712,799 | 7/1955 | Braibanti et al. | |
| 2,810,159 | 10/1957 | Teichmann | 18—12 |
| 3,023,456 | 3/1962 | Palfey | 18—12 |
| 3,114,171 | 12/1963 | Colombo | 18—12 |
| 3,150,214 | 9/1964 | Scalora et al. | 18—12 XR |
| 3,170,190 | 2/1965 | Fields | 18—12 |
| 3,407,438 | 10/1968 | Selbach | 18—12 |

WILLIAM J. STEPHENSON, Primary Examiner